Oct. 4, 1938.   E. R. WEEK, JR   2,132,197
METHOD OF MAKING PISTON RINGS
Original Filed Aug. 31, 1934
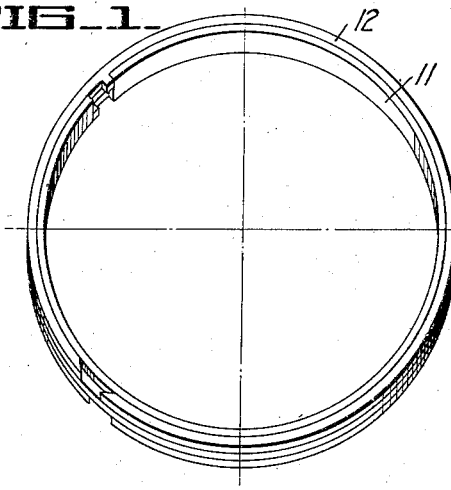
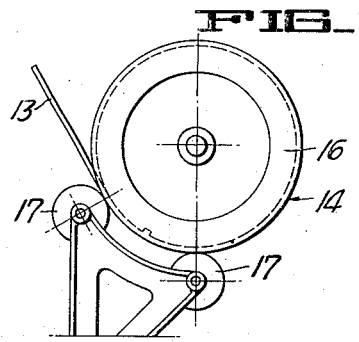
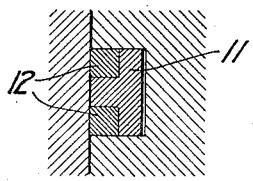
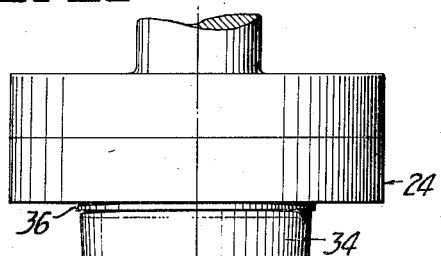
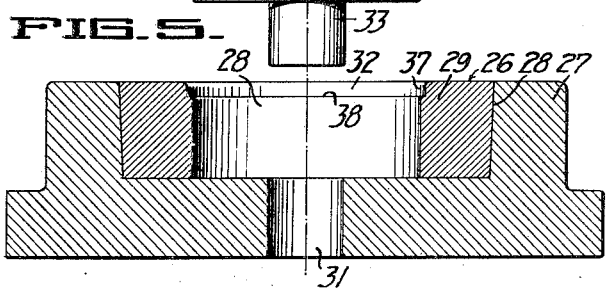
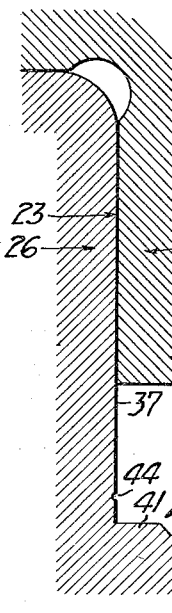
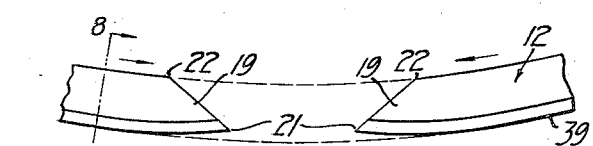
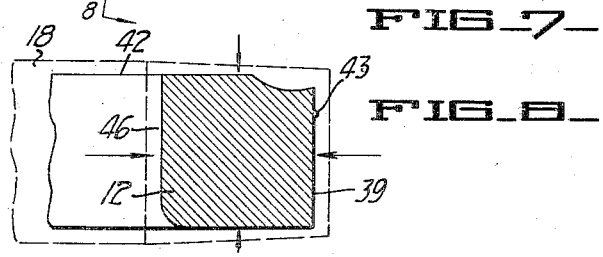
INVENTOR.
Edmund R. Week Jr.
BY Joseph B. Gardner
ATTORNEY Patented Oct. 4, 1938

2,132,197

UNITED STATES PATENT OFFICE 2,132,197

METHOD OF MAKING PISTON RINGS

Edmund R. Week, Jr., Oakland, Calif.

Application August 31, 1934, Serial No. 742,220
Renewed July 12, 1937

3 Claims. (Cl. 29—156.61)

The invention relates to piston rings such as used in connection with internal combustion engines, and relates more particularly to the composition of such rings and to the method of fabricating same.

Piston rings of internal combustion engines may be divided roughly into two classes, the single on piece type and the multiple piece spring type. The former belongs to a class comprising a single annular ring, as of cast iron or the like, which is mounted in a ring groove in the piston and serves by its own resilience to expand outwardly from the ring groove into sealing engagement with the cylinder wall. This type of ring by reason of its simplicity and relative cheapness has found a very wide usage in internal combustion engines. However, as may be understood, a single piece ring must have the dual quality of resilience so as to firmly urge the ring against the cylinder wall and in addition have a proper bearing surface against the cylinder walls for procuring a smooth and uninterrupted seal. As may be also understood, these qualities of resilience and bearing surface are not necessarily or normally found together in a single metal and accordingly a plurality of members having specially selected metals to accomplish separately the functions of resilience and cylinder engagement will do so better than will the dual functioning, one piece, cast iron rings. Thus, there has been developed the multiple piece spring type of ring which utilizes a resilient body ring which carries and presses outwardly into engagement with the cylinder walls one or more special cylinder engaging rings. This type of ring makes possible the use of separate metals in the ring for carrying out the separate resilient and cylinder engaging functions. Accordingly these rings have been found to function remarkably well and at a considerably higher efficiency than the first mentioned type. Especially is this true at higher engine speeds where the relatively poor resilience of the one piece ring is incapable of preventing an excessive high blow-by of products from the combustion chamber of the cylinder into the crank case.

While the multiple piece, spring type of ring is capable of affording these and many other important advantages over the simple one piece ring first mentioned, the multiple piece ring ordinarily involves in its construction the use of relatively small cylinder engaging rings and the construction of these small rings to withstand the high pressures and temperatures obtaining in the cylinder has been the source of weakness in these rings. At first attempts were made to mold these relatively small rings from cast iron, but they were found much too brittle to give lasting service and would, after a relatively short period of use, be broken. Attempts followed the use of cast iron in the field of bronze but it was found that when this substance was cast the same was substantially as brittle as the cast iron and relatively unusable. Also, when the bronze rings were drawn or extruded they were much too soft, were quickly mutilated, and consumed by oxidation and disintegration.

Applicant has found through exhaustive tests extending over a protracted period of experimentation that these small cylinder engaging rings of the multiple piece type should be substantially as hard as the cylinder wall that they engage, or if there is any difference in hardness that it should be on the softer side, preferably not exceeding from 5 to 15 points on the Rockwell "B" scale. It has been demonstrated that if these small rings are materially harder than the cylinder side walls, they will have an abrasive action thereon tending to scratch and deform the cylinder. On the other hand, if such rings are materially softer than the cylinder wall, they permit the embedding and seating of particles of dust and other foreign substances which in turn have an abrasive action on the cylinder side wall. Furthermore, it has been found that coordinated with the aforesaid hardness the rings must be of maximum toughness so as to resist wear and deformation. Also, these small rings should be of low resilience and relatively flexible so that substantially the total resilience of the ring will reside in the body ring and the smaller rings will be uniformly pressed outwardly by the body ring into close conformity with the cylinder walls. In addition, the rings should have a substantially different fineness of surface grain structure and texture than the cylinder walls so as to afford a low coefficient of friction therebetween.

In satisfying the above conditions, attempts have been made to use materials such as steel in one form or another, but while the hardness of the ring was thus obtained, the other desired characteristics did not follow. Tempered high carbon steels in most instances were too hard, too abrasive and much too stiff and resilient. Annealed steels proved too soft, became mutilated and of little use. In accordance with my invention, however, and as a principal object thereof, I have provided for the use of materials such as steel in the construction of these small rings by initially selecting a certain hardness and carbon or other alloy content and then processing and working the metal in a way as to retain and increase its hardness to approximately that of the cylinder side wall with which it is used, to greatly increase its toughness, to introduce a necessary degree of pliancy and to maintain its resilience low.

Another object of the invention is to cause the desired fabrication of the metal as aforesaid simultaneously with and by the same operations involved in fabricating the ring structure and thereby not only to greatly simplify the manufacture of the ring but also utilize the changing molecular arrangement involved in the fabrication of the steel to effect a greatly improved construction in the cylinder engaging edge and the free ends of the ring.

A further object of the invention is to provide a ring of the character described having extremely minute annular beads extending around the rings which initially engage the cylinder wall and which serve to quickly wear off to provide a proper seating of the rings against the cylinder walls.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figures 1 and 2 are respectively perspective and sectional end views of a multiple piece spring type ring in connection with which the method and apparatus of my invention relate.

Figure 3 is a side view of the bending and rolling device used in connection with my invention.

Figure 4 is an elevational view of the male half of a die used in carrying out the invention.

Figure 5 is a sectional elevation of the female half of the die.

Figure 6 is an enlarged fragmentary sectional view of the opposite ring engaging portion of the die.

Figure 7 is a fragmentary plan view of the ring showing the flow of material and formation of the ring upon the die.

Figure 8 is a transverse sectional view of the ring of Figure 7 taken substantially on the plane of the line 8—8 of Figure 7.

The piston ring shown in Figures 1 and 2 of the drawing is illustrative of the multiple piece spring type of ring referred to in the foregoing. This particular ring is of an improved form which has been fully described and claimed in my co-application entitled "Piston ring and method of forming same" and bearing the application Serial Number 742,033 and filed August 30, 1934. This ring, however, in common with other rings of its type, includes a resilient body or main ring 11 which carries one or more side cylinder engaging rings 12. The body ring by reason of its appreciable size and inclusion of resilience is not of critical construction from a strength and wearing standpoint as are the smaller side rings 12. It is with these side rings that the present invention is concerned and in the making of these small rings strong, durable, and possessive of the other desirable characteristics hereinbefore mentioned.

In the vast majority of the multiple piece rings, and as in the present instance, the side cylinder engaging rings are of square or rectangular cross section. For simplicity in the construction of these rings I prefer to start with a steel wire 13 which is commercially square and of substantially the cross sectional dimensions to be used with the body ring. In accordance with the present invention, I select a drawn annealed steel wire of 50 to 65 point hardness on the Rockwell "B" scale and which has about a 1 per cent carbon content. This wire at the outset is too soft for immediate use as a piston ring but in the course of the method of the present invention the same is hardened to approximate the hardness of the cylinder wall and is worked to increase its toughness.

The wire is first fed into a bending and rolling machine 14 which is of conventional design including an enlarged and grooved roller 16 which cooperates at its circumference with smaller wire confining and bending rollers 17. The wire is delivered from the rollers in a helical formation and is cut into single unit coils 18. Preferably in cutting the coils, the free ends 19 thereof are arranged, with the radially outer edges 21 thereof cut diagonally ahead of the inner edges 22. Also will be understood the bending of the normally straight wire into a circular formation will cause by relative crowding and expansion of the material respectively at the inner and outer circumferential, axially extending, sides with a corresponding increase and decrease of the axially extending dimensions of such sides. This has the effect of distorting the cross-sectional shape of the ring as indicated roughly in dotted lines in Figure 8 from which shape the ring is pressed into a sharply defined square by means of the die and as shown in full lines of Figure 8.

The coils or loops 18 when cut as above, are ready for working and processing and intimate forming leading to the final product. All of these operations are arranged, in accordance with my invention, to be effected by a single die 23. The latter as here shown is comprised of male and female sections 24 and 26 which are arranged for interengaged positioning for forming and working the ring therebetween. The female member is of stationary construction and includes an anvil base 27 having a recess 28 for the reception of an annular die block 29 and is formed centrally therethrough with a guide bore 31. Formed in the block and opening jointly to the top and inner surface thereof is an annular ring seat 32 which is arranged to cooperate with the male section to compress and form the ring therebetween.

The male section of the die is arranged for mounting in a press and comprises concentrically arranged guide projection 33, skirt 34, and shoulder abutment 36 which are arranged respectively for movement into the guide bore 31, the recess 28, and the seat 32. The skirt 34 is formed with a small downwardly convergent taper (in the present case about 4°) for entering into and spreading the ring loop 18 against the outer wall 37 of the ring seat 32. Following this radial compression or swedging of the ring and on further movement of the male sections, the ring is compressed axially between the shoulder 36 and the base 38 of the seat 32. Preferably in order that the outer cylinder engaging side 39 of the ring may have the top edge thereof sharply defined, the base 38 of the ring seat is formed with a rise 41 adjacent the radially outer edge thereof for depressing and sharply defining the outer edge of the ring top surface 42.

Heretofore piston rings have been either cast or turned and in their formation have been provided on their outer cylinder engaging sides with minute projections which have served when the ring is first used to wear off and afford a proper seating of the ring. These projections, however, have been entirely incidental to the process used in forming the ring and have arisen by reason of imperfections in casting and by tool marks from turning. Applicant has found, however, that such projections are highly useful in procuring a good seating for the ring against the cylinder side wall, and has, as a result, purposely provided for their inclusion in the present die. As here shown, a very minute annular bead 43 is provided around the ring surface 39 and is formed by a fine scratch 44 made in the wall 37 of the ring seat.

In forming the ring it will be noted that the same is first subjected to a radial expansion of the inner surface 46 thereof by the tapered skirt portion of the male section of the die while the outer side 39 of the ring is maintained at constant diameter by the side wall 37. During this initial swedging or compressing of the ring member, the same is free to expand both in the direction of the top and bottom sides thereof and circumferentially. Following this initial swedging of the ring, the same is pressed between the shoulder 36 and the base 38 of the ring seat while maintaining the ring sides 39 and 46 compressed and thus permitting of only a circumferential flow of the material comprising the ring. The effect of this rouble compression is shown roughly in Figure 8 where, in dotted lines is represented the original outline of the ring, and in solid lines the final form thereof. Since the ring is of annular form it will be understood that the circumferential flow of material will be greater at the outer side 39 thereof than at any more inwardly portion of the ring. This greater flow of material is also augmented by the additional displacement of material caused by the depression formed in the outer edge of the top surface of the ring. These two effects combined give a greater proportionate flow of material at the outer surface of the ring than at the inner circumference thereof. Since this flow is in the direction of the free ends 19 of the ring, it will be understood that the excessive flow of material at the outer side of the ring will cause a greater circumferential advancement of the outer edges 21 of the ends than of the inner edges 22 with the result that the ring will be progressively curved inwardly from the normal circumference thereof towards the free ends of the ring, and since this effect is accumulative, the free ends will be drawn well within the circumference of the ring. This feature is of particular advantage since these outer edges are sharply defined and have been a source of nuisance in the past in that they required either filing down or rounding off to prevent their digging into and scratching the cylinder wall. In accordance with the present invention, however, and as above explained, these ends are automatically withdrawn from the circumference of the ring as indicated in Figure 7 and are thus removed from immediate contact with the cylinder wall.

The flow of material circumferentially has an additional effect on the ring in that it changes the texture of the outer cylinder engaging surface thereof. Since there is a relative shearing of material caused by the different degrees of material flow aforesaid, it will be understood that the tendency of such flow is to elongate the metal fibers in the direction of shear. This has the effect of changing the rather granular structure of the original steel wire into a vastly tougher fibrous or grain structure which in addition, since it contrasts with the surface texture of the cast cylinder wall, affords a low coefficient of friction between the cylinder wall and the piston ring.

As an important feature of my invention, the ring is set, during the compressions aforesaid, to a diameter closely corresponding to that of the cylinder with which the ring is to be used. In this manner any required expansion or contraction of the ring to constantly engage the cylinder wall will be but slight from its set diameter and will not be materially resisted by the ring. Thus as will be clear, the ring will be free for expansion against the cylinder wall by the body ring and will as readily be retractable to conform to minor variations in cylinder bore diameter. This setting is effected by raising the stress on the ring to a point above its elastic limit, so that the same will retain the shape imparted to it by the die. Also this straining of the ring fibers is productive of a certain degree of flexibility which permits the latter to more closely follow any variations in the cylinder.

A further and most important feature of the compression aforesaid lies in the raising of the hardness of the ring metal. As hereinbefore pointed out, it is highly desirable that the hardness of the ring closely approach that of the cylinder side walls. I have found that the average hardness of such side walls is about from 100 to 110 points on the Rockwell "B" scale. While the original wire had a hardness of but 50 to 65 points, the same is hardened by the compressions aforesaid to approximately 95 points, this being preferable to maintain the ring slightly on the soft side on a balanced hardness with the cylinder wall. Also, as may be understood, further compressions of the material will be productive of a further hardening of the metal, and in accordance with the design of the present die such further compression may be readily affected as desired by simply raising the die block 29 in the base 27.

I claim:

1. The process of forming a generally round split type piston ring with the free ends thereof turned in from the circumference thereof which comprises, compressing of the ring axially to provide a circumferential flow of material towards said ends, and depressing of an outer edge thereof to cause a disproportionately greater flow of material about the outer side than the inner side of the ring.

2. The method of forming a generally round split type piston ring which comprises, compressing the ring axially while holding the sides of the ring radially to cause a circumferential flow of material, and in axially compressing the ring to a greater extent adjacent the outer circumferential side thereof to cause a disproportionately greater flow of material adjacent said side and the turning in of the free ends of the ring.

3. The method of forming a generally round split type piston ring from a ring-shaped member of tough ductile steed of approximately 50 to 65 point hardness on the Rockwell "B" scale and of approximately 1% carbon content which comprises, radially compressing the inner and outer peripheral surfaces of the member while leaving the axially spaced sides and ends of the ring free to expand, and then axially compressing said sides while holding said surfaces against expansion and while leaving the ends of the ring free to expand circumferentially, said compression and expansion being sufficient to raise the hardness of said material to approximately 90 to 110 point hardness on the Rockwell "B" scale.

EDMUND R. WEEK, Jr.